Sept. 19, 1950     H. W. SCHAUFELBERGER     2,522,965
WORK-FEEDING FIXTURE FOR TABLE SAWS
Filed Oct. 8, 1946     3 Sheets-Sheet 1
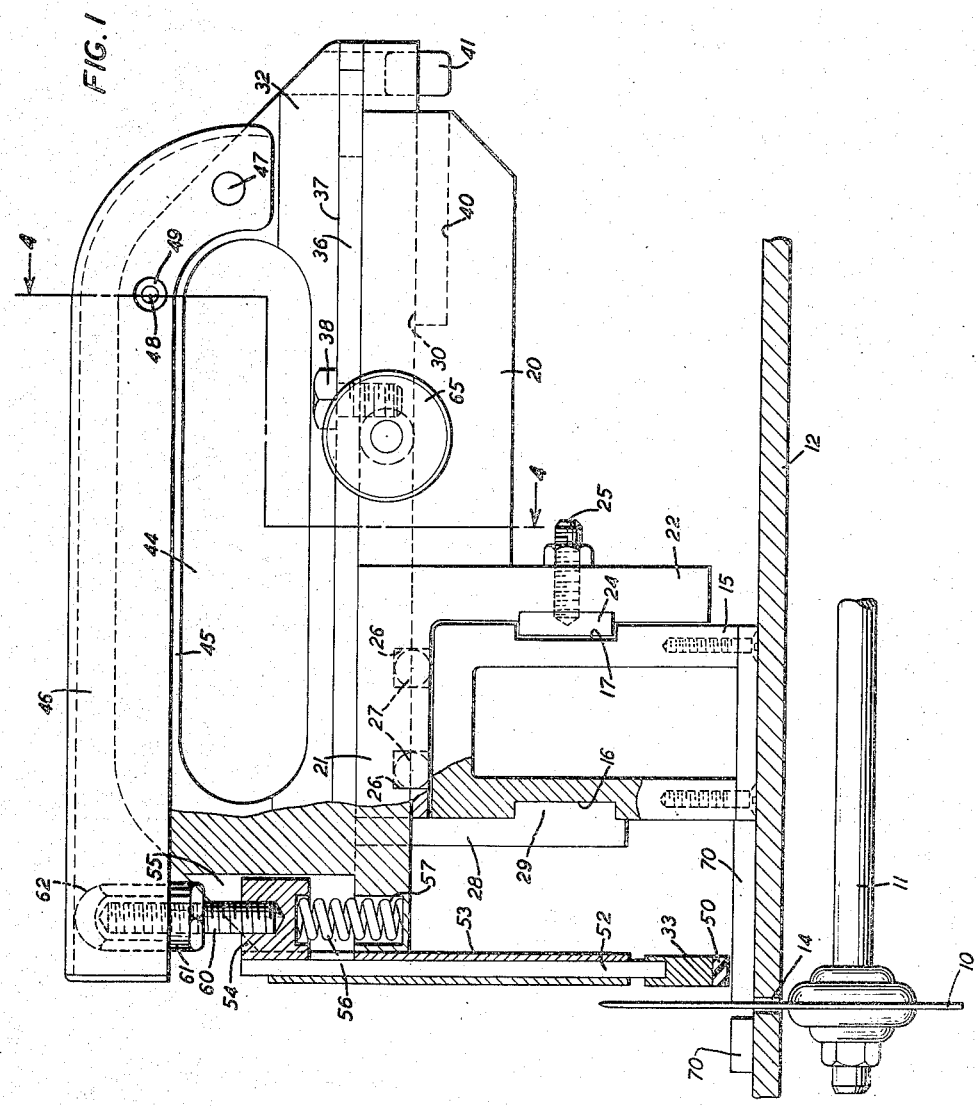
INVENTOR
H. W. SCHAUFELBERGER
BY
W. C. Parnell
ATTORNEY

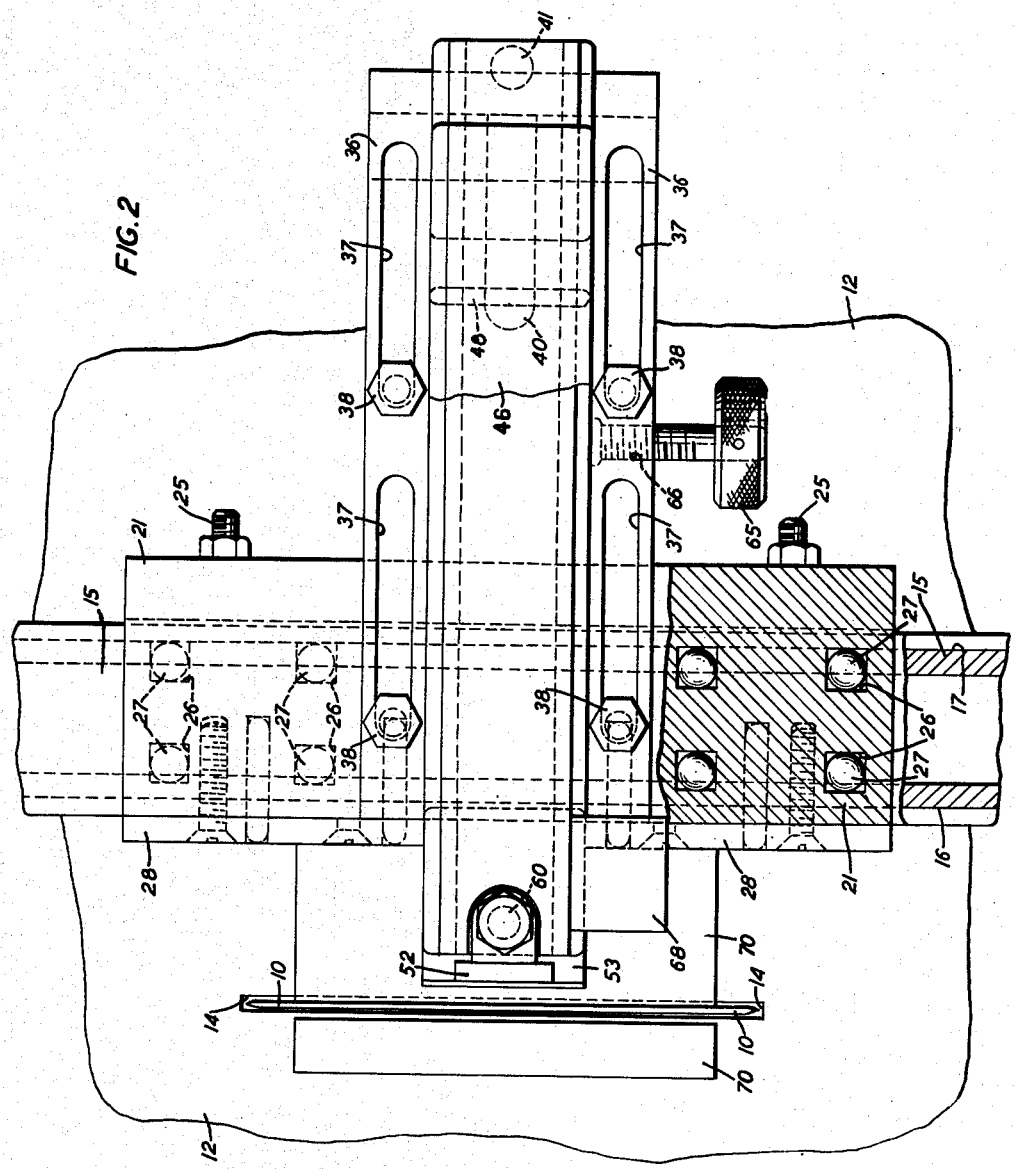

Sept. 19, 1950 H. W. SCHAUFELBERGER 2,522,965
WORK-FEEDING FIXTURE FOR TABLE SAWS
Filed Oct. 8, 1946 3 Sheets-Sheet 3
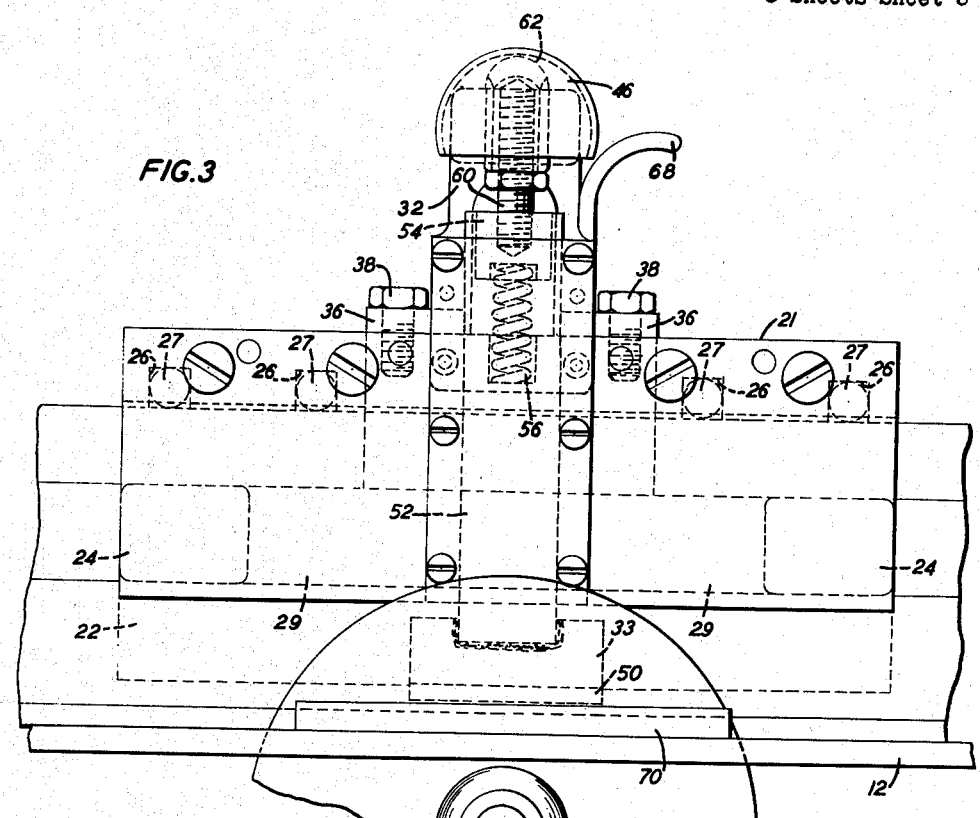
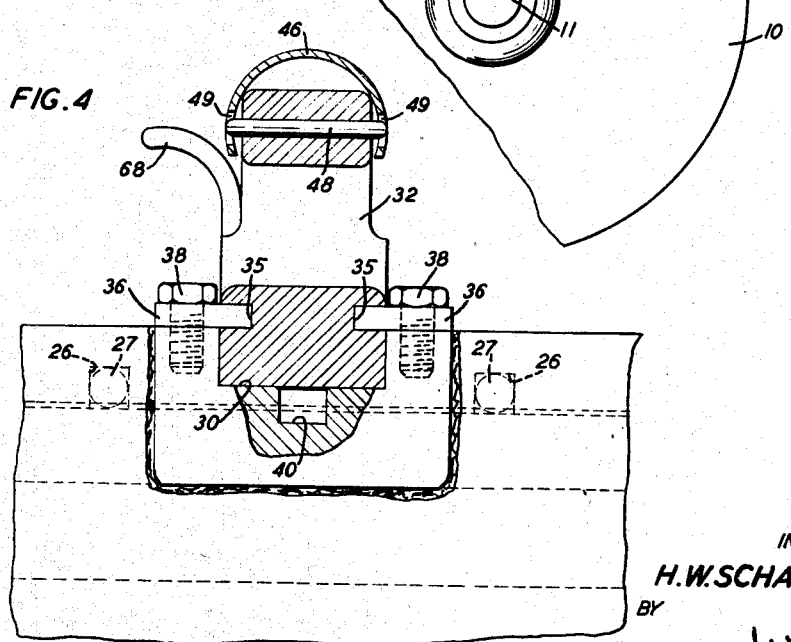
INVENTOR
H.W.SCHAUFELBERGER
BY
ATTORNEY Patented Sept. 19, 1950

2,522,965

UNITED STATES PATENT OFFICE 2,522,965

WORK FEEDING FIXTURE FOR TABLE SAWS

Henry W. Schaufelberger, Haverhill, Mass., assignor to Western Electric Company, Incorporated, New York, N. Y., a corporation of New York Application October 8, 1946, Serial No. 701,933

5 Claims. (Cl. 143—51)

This invention relates to work feeding fixtures for rotary cutters, and more particularly for feeding thin and/or small pieces of work to rotary saws.

The conventional forked stick has been used for years as a means of feeding thin and/or small articles to a rotary saw, but this method is not always satisfactory in that only the following edge of the work is under the immediate control of the stick and with the use of the stick, the operator's hand moves directly toward the saw which is obviously a hazardous condition.

An object of the invention is to provide a work feeding fixture which may be readily attached to the conventional guide bar on the table of a rotary saw and engage any desired portion or portions of work throughout its length and at varied distances from the saw, keeping the operator's hand, which controls the fixture, a safe distance from the saw.

With this and other objects in view, the invention comprises a work feeding fixture for rotary cutters, particularly rotary saws having a work supporting table through which the saw extends and a longitudinal guide bar adjustable toward and away from the saw. The fixture comprises a supporting frame formed to straddle the guide bar and ride thereon in a path parallel to the saw. A work engaging element normally held above the table is movable by the actuation of a handle to grip work to be fed to the saw at any desired position on the upper surface of the work to move the work relative to the saw as the fixture is moved longitudinally of the guide bar. The handle and its element are supported by a carriage adjustable laterally of the frame to position the element varied distances relative to the saw depending upon the width of the work being fed to the saw.

Other objects and advantages will be apparent from the following detailed description when considered in conjunction with the accompanying drawings, wherein Fig. 1 is a fragmentary sectional view of a rotary saw with the work feeding fixture mounted thereon;

Fig. 2 is a top plan view of the structure shown in Fig. 1, portions thereof being shown in section;

Fig. 3 is a front elevational view of the structure shown in Fig. 1; and

Fig. 4 is a fragmentary sectional view taken substantially along the line 4—4 of Fig. 1.

Referring now to the drawings, only a small part of a rotary saw mechanism has been shown, but it is believed that such saws are well known in the art and with the present illustration a complete understanding of the invention may be had. The conventional rotary saw 10 is mounted upon a driven shaft 11 beneath a table 12 and extends through an elongate slot 14 in the table. A guide bar 15 of the conventional type is mounted upon the table 12 and is adjustable by suitable means (not shown) toward or away from the saw 10 maintaining a parallel relationship with the saw at all times. The guide bar 15 in the present instance has longitudinal grooves 16 and 17 in the sides thereof, these grooves being employed in guiding the fixture as will hereinafter be described.

The work feeding fixture includes a main frame 20 having a lateral portion 21 extending over the top of the guide bar 15 and a vertical portion 22 integral with and extending downwardly from the lateral portion 21. The vertical portion 22 is grooved to receive guide blocks 24 held in place by threaded members 25 and receivable in the groove 17 of the guide bar. The horizontal member 21 of the frame 20 has a plurality of spaced recesses or pockets 26 for ball members 27 which form the only contact between the frame 20, that is, its portion 21 and the top of the guide bar 15. The ball members therefore provide substantially frictionless supports for the fixture to make it easy for the operator to move with the work relative to the saw. It will be noted by viewing Fig. 2 that the ball members in their pockets are disposed in pairs at spaced positions throughout the length of the lateral portion 21 of the frame.

Additional guides 28 positioned parallel with the vertical member 22 of the frame are mounted at spaced positions upon the face of the lateral portion 21 as illustrated in Fig. 2 and extend downwardly beyond the groove 16 where inwardly projecting portions 29 extend into the groove and cooperate with the blocks 24 in guiding the fixture longitudinally of the guide bar 15. The upper central portion of the frame 20 is grooved longitudinally at 30, the groove extending at right angles to the portion 21 and the saw 10.

A carriage 32 is positioned in the groove 30 to be moved to any desired adjusted position longitudinally of the groove to vary the position of a work clamping element 33 laterally relative to the saw 10. The carriage 32 is grooved at 35 along its sides to receive guide plates 36 which are mounted upon the upper surface of the frame and have their inner ends extend over the groove 30. The guide plates 36 have elongate apertures 37 therein to receive their mounting screws 38, the apertures enabling the operator to adjust the plates longitudinally of the frame, depending upon the desired adjustment for the carriage 32. An additional groove 40 is provided in the frame for a portion of the length of the groove 30 near the rearmost end thereof to receive a stop 41 supported by the carriage and serving to limit the forward adjustment of the carriage on the frame. The carriage 32 also has an elongate aperture 44 closed at its top by a handle portion 45 to cooperate with an operating handle 46 for the operator to grip when operating the fixture. The operating handle 46 is pivotally mounted on the carriage at 47, its free end being positioned to actuate the clamping element 33. The motion of the handle 46 is limited by a pin 48 extending through the handle portion 45 of the carriage as shown in Fig. 4 with its ends positioned in apertures 49 of the operating handle 46.

The clamping element 33 has a flexible work engaging member 50 formed of suitable material, such as soft rubber, fixedly mounted on the under surface thereof. A slide 52 supports the element 33 upon the lower end thereof and extends upwardly through a guide 53 mounted upon the adjacent end of the carriage 32. A projection or block 54 is mounted upon the upper end of the slide 52 and is receivable in a cutaway portion 55 of the carriage 32. A spring 56 positioned in a recess 57 of the carriage 32 normally urges the projection 54, with the slide 52 and element 33, upwardly away from the work and saw table. A threaded element 60 mounted in the projection 54 has a nut 61 mounted on the upper end thereof, the rounded upper end 62 of the nut being positioned within the hollow operating handle 46 forming a connection between the operating handle and the element 33.

The adjustment of the carriage 32 toward or away from the cutter 10 is under the control of a locking screw 65 disposed in a threaded aperture 66 of the frame 20 and positioned to engage the portion of the carriage disposed in the groove 30. A thumb guard 68 is mounted upon the forward end of the carriage 32 for the thumb of the operator when gripping the handles 46 and 45 in actuation of the fixture.

Upon consideration of the operation of the work feeding fixture, let it be assumed that the guide bar 15 has been positioned the desired distance from the saw 10 on the table 12. The work feeding fixture positioned on the guide bar may be adjusted to move the carriage and with it the element 33 to a desired position relative to the saw. When this adjustment has been made the lock screw 65 may be tightened to maintain the desired adjustment of the fixture. The work 70 is then placed on the table adjacent the guide bar in front of the saw and the fixture is moved longitudinally of the guide bar to position the element 33 at the desired location over the work where the operator wishes to contact the work in moving it relative to the saw. The operator then, through a gripping action, or through a combined downward force of his hand on the operating handle, and a gripping action on both handles 45 and 46, may move the handle 46 about its pivot 47 to move the slide 52 downwardly with the element 33 to cause firm engagement of the portion 50 with the work. The fixture may then be moved longitudinally of the guide bar advancing the work to the saw.

It is possible with this fixture to grip and control the leading end of the work being advanced to the saw and to frequently thereafter, if so desired, grip subsequent portions of the work throughout the length of the work to maintain complete control of the work in the area of the saw as the work is being moved past the saw. With the illustration shown, particularly in Figs. 1 and 2, the element 33 is positioned in close proximity to the saw but some distance from the guide bar 15. It is apparent that the element 33 may be moved closer to the saw, if so desired. Furthermore, should the work be narrower than that shown, it is possible for the carriage to be moved to a position where the element 33 would be disposed immediately adjacent the guide bar 15 to engage very narrow work which is to be fed to the saw. The guide 53 with the slide 52 and the element 33 in this instance would be positioned between the guides 28. Throughout the operation of the fixture, the operator's hand is positioned a safe distance from the saw and although it is moved parallel with the saw, it is never moved toward the saw, thus eliminating one of the hazardous conditions existing with the commercially known forked stick.

Although specific improvements of the invention have been shown and described, it will be understood that they are but illustrative and that various modifications may be made therein without departing from the scope and spirit of this invention as defined by the appended claims.

What is claimed is:

1. A work feeding fixture for a rotary saw having a work supporting table and a guide bar having longitudinal grooves in the sides thereof, adjustably mounted on the table predetermined distances from the saw depending on the widths of portions to be cut from the work and parallel with the saw, the fixture comprising a frame positioned for longitudinal movement on the guide bar and having spaced pockets in its under surface, ball members disposed in the pockets of the frame, resting on the guide bar and supporting the frame free of the guide bar, a work engaging element movably supported by the frame, means normally holding the element above the table, means actuable to move the element into engagement with the work on the table to move the work relative to the saw as the frame is moved on the guide bar, and guides carried by the frame adjacent opposite sides of the guide bar and having portions riding in the grooves of the guide bar to guide the frame with the element in a fixed path parallel with the saw.

2. A work feeding fixture for a rotary saw having a work supporting table and a guide bar adjustably mounted on the table predetermined distances from the saw depending on the widths of portions to be cut from the work, the fixture comprising a frame mounted on the guide bar for movement thereon in a fixed path parallel with the saw, a carriage, a work engaging element carried thereby, means carried by the frame to support the carriage thereon for adjustment of the carriage and work engaging element laterally depending on the position of the guide bar relative to the saw to position the work engaging element for movement, with the carriage and frame, in a path adjacent the saw, means to secure the carriage in any adjusted position on the frame, means on the carriage to normally urge the work engaging element above the table, and an actuable member on the carriage to move the element into engagement with the work on the table to move the work relative to the saw as the frame and carriage are moved on the guide bar.

3. A work feeding fixture for a rotary saw having a work supporting table and a guide bar adjustably mounted on the table predetermined distances from the saw depending on the widths of portions to be cut from the work, the fixture comprising a frame mounted on the guide bar for movement thereon in a fixed path parallel with the saw, a carriage, a work engaging element carried thereby, means carried by the frame to support the carriage thereon for adjustment of the carriage and work engaging element laterally depending on the position of the guide bar relative to the saw to position the work engaging element for movement, with the carriage and frame, in a path adjacent the saw, means to secure the carriage in any adjusted position on the frame, means on the carriage to normally urge the work engaging element above the table, an actuable member on the carriage to move the element into engagement with the work on the table to move the work relative to the saw as the frame and carriage are moved on the guide bar, and variable means interposed between the actuable member and the element to vary distances of movement of the element toward the table with variations in the thicknesses of the work.

4. A work feeding fixture for a rotary saw having a work supporting table and a guide bar adjustably mounted on the table predetermined distances from the saw depending on the widths of portions to be cut from the work, the fixture comprising a frame mounted on the guide bar for movement thereon in a fixed path parallel with the saw, a carriage, a work engaging element carried thereby, means carried by the frame to support the carriage thereon for adjustment of the carriage and work engaging element laterally depending on the position of the guide bar relative to the saw to position the work engaging element for movement, with the carriage and frame, in a path adjacent the saw, means to secure the carriage in any adjusted position on the frame, means on the carriage to normally urge the work engaging element above the table, a guide mounted on the carriage to support the work engaging element in its movement relative to the carriage, and an actuable member on the carriage to move the element into engagement with the work on the table to move the work relative to the saw as the frame and carriage are moved on the guide bar.

5. A work feeding fixture for a rotary saw having a work supporting table and a guide bar adjustably mounted on the table predetermined distances from the saw depending on the widths of portions to be cut from the work, the fixture comprising a frame mounted on the guide bar for movement thereon in a fixed path parallel with the saw, a carriage, a work engaging element carried thereby, means carried by the frame to support the carriage thereon for adjustment of the carriage and work engaging element laterally depending on the position of the guide bar relative to the saw to position the work engaging element for movement, with the carriage and frame, in a path adjacent the saw, means to secure the carriage in any adjusted position on the frame, means on the carriage to normally urge the work engaging element above the table, a handle on the carriage for use in moving the element, carriage and frame on the guide bar relative to the saw, and a lever pivotally mounted on the handle to be actuated when the handle is gripped to move the element into engagement with the work on the table to move the work relative to the saw.

HENRY W. SCHAUFELBERGER.

REFERENCES CITED

The following references are of record in the file of this patent:

UNITED STATES PATENTS

| Number | Name | Date |
| --- | --- | --- |
| 918,152 | Hodgen | Apr. 13, 1909 |
| 1,443,789 | Humphreys | Jan. 30, 1923 |
| 1,652,132 | Donald | Dec. 6, 1927 |
| 2,410,467 | Valentine | Nov. 5, 1946 |

FOREIGN PATENTS

| Number | Country | Date |
| --- | --- | --- |
| 185,254 | Great Britain | Sept. 7, 1922 |